(12) United States Patent
Pfaendner et al.

(10) Patent No.: US 6,362,278 B1
(45) Date of Patent: Mar. 26, 2002

(54) FUNCTIONALIZED POLYMERS

(75) Inventors: Rudolf Pfaendner, Rimbach; Heinz Herbst, Heppenheim; Kurt Hoffmann, Weitenau-Steinen, all of (DE); Samuel Evans, Marly; Alfred Steinmann, Praromah, both of (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 09/284,840

(22) PCT Filed: Oct. 20, 1997

(86) PCT No.: PCT/EP97/05782

§ 371 Date: Apr. 21, 1999

§ 102(e) Date: Apr. 21, 1999

(87) PCT Pub. No.: WO98/18830

PCT Pub. Date: May 7, 1998

(30) Foreign Application Priority Data

Oct. 31, 1996 (EP) .............................. 96810726

(51) Int. Cl.$^7$ .......................................... C08L 101/00
(52) U.S. Cl. .......................................... 525/69; 525/70
(58) Field of Search ..................... 525/69, 70

(56) References Cited

U.S. PATENT DOCUMENTS

| | | | | |
|---|---|---|---|---|
| 4,520,171 A | | 5/1985 | Diveley et al. ............. | 525/279 |
| 4,857,596 A | * | 8/1989 | MacLeay et al. ........... | 525/194 |
| RE34,791 E | | 11/1994 | Kazmierzak et al. ....... | 525/142 |
| 5,420,204 A | * | 5/1995 | Valet et al. ................. | 525/125 |
| 5,457,204 A | * | 10/1995 | Steinmann .................. | 544/215 |
| 5,521,282 A | * | 5/1996 | Steinmann .................. | 528/419 |
| 5,534,618 A | * | 7/1996 | Steinmann .................. | 528/423 |
| 5,541,274 A | | 7/1996 | Steinmann .................. | 526/263 |

FOREIGN PATENT DOCUMENTS

| | | |
|---|---|---|
| DE | 3517798 | 11/1986 |
| DE | 4230157 | 12/1993 |
| EP | 0 103 148 * | 3/1984 |
| EP | 0303986 | 2/1989 |
| EP | 0306729 | 3/1989 |
| EP | 0638597 | 2/1995 |
| EP | 0673949 | 9/1995 |
| WO | 93/20133 | 10/1993 |

OTHER PUBLICATIONS

Kunstoffe, vol. 83, (1993), 10, pp. 820–822.
Kunstoffe, vol. 85, (1995), 4, pp. 446–450.
Kunstoffe, vol. 83, (1993), 5, pp. 369–372.
Kunstoffe, vol. 84, (1994), 9, pp. 1153–1158.
Kunstoffe, vol. 83, (1993), 11, pp. 926–929.
Fuzessery, Recycle '91, Apr. 3–5, 1991, pp. D4.1–D4.13.
Fuzessery, Recycle '95, pp. 6–4.3–6–4.9.
Polymer Degradation and Stability, vol. 25, (1989), pp. 121–141.
J.M.S.–Pure Appl. Chem., A30(4), pp. 287–292, (1993).
Die Angewandte Makromol. Chem., 158/159, (1988) pp. 221–231 (2678).
Advances in Polymer Science, vol. 101, pp. 65–167 (1991).
Oxidation Inhibition in Organic Materials, vol. I, pp. 193–224, (1989).
Makromol. Chem., Macromol. Symp. 70/71, pp. 407–418, (1993).
Derwent Abstr. 93–378500/48 for DE 4230157.

* cited by examiner

*Primary Examiner*—D. R. Wilson
(74) *Attorney, Agent, or Firm*—Luther A. R. Hall; David R. Crichton

(57) ABSTRACT

This invention relates to a process for stabilizing and at the same time phase compatibilising plastics or plastic compositions by incorporating polymeric compounds obtainable by reacting a compound selected from the group consisting of the sterically hindered phenols, sterically hindered amines, lactones, sulfides, phosphites, benzotriazoles, benzophenones and 2-(2-hydroxyphenyl)-1,3,5-triazines, which compounds contain at least one reactive group, with a compatibilisator.

2 Claims, No Drawings

FUNCTIONALIZED POLYMERS

The present invention relates to stabilising plastics and plastic compositions (virgin materials or recyclates, optionally blended with virgin materials) while at the same time improving the mechanical properties by incorporating specific compatibilisers.

The preparation of polymer blends is an established method for producing plastics having novel properties. As is known, however, polymers of different structures usually cannot be blended with each other, i.e. processing two different plastics gives a macroscopical mixture having insufficient mechanical properties. To improve the compatibility and therefore also the properties of the plastic blends, so-called compatibilisers are commercially available. These compatibilisers are polymers which prevent or reduce the separation of two- or multi-component systems or which improve the dispersion, thereby producing a homogeneous blend of different plastics which has good mechanical properties.

The known compatibilisers are predominantly based on polymers of polar and nonpolar structures which are produced by customary polymerisation reactions.

Compatibilisers are used in virgin plastic compositions and also, increasingly, in recyclates. In this case, the production process, or the used plastics collection, often results in plastic compositions the mechanical properties of which are only adequate for new applications if compatibilisers are added to them. In *Kunststoffe* 83 (1993), 10, 820–822 and in *Kunststoffe* 85 (1995) 4, 446–450, K. Hausmann discusses the problem of recycling incompatible plastics such as polyethylene/polyethylene terephthalate (PEIPET) and polyamide/polyethylene (PA/PE). For recycling, compatibilisers are used. In *Kunststoffe* 83 (1993) 5, 369–372 R.-E. Grützner, R. Gärtner and H.-G. Hock published research on similar systems (PE/PA composite foils). R. Mühlhaupt and J. Rösch report on phase compatibilisers for polypropylene/polyamide (PP/PA) alloys in *Kunststoffe* 84 (1994) 9, 1153–1158. In *Kunststoffe* 83 (1993) 11, 926–929, G. Obieglo and K. Romer also describe compatibilisers for use in plastic recycling. In *Recycle '91*, 8/5-1 and *Recycle '95*, 6/4-3, S. Fuzessery presents compatibilisers and polymer modifiers for virgin and recycled thermoplastics. It is known to bind stabilisers to a polymer to obtain a better blend in the product to be stabilised and to prevent the stabiliser from migrating therefrom. This has been suggested, inter alia, by M. Minagawa in *Polymer Degradation and Stability* 25 (1989), 121–141 or by H. Yamaguchi, M. Itoh, H. Ishikawa and K. Kusuda in *J.M.S.—Pure Appl. Chem.*, A30(4), (1993), 287–292. In *Die Angewandte Makromolekulare Chemie* 158/159 (1988), 221–231, in *Advances in Polmer Science* 101, pages 65–167, Springer-Verlag Berlin Heidelberg, 1991 and in Jan Pospísil, Peter P. Klemchuck, *Oxidation Inhibition in Organic Materials*, Vol. 1 (1989), 193–224, Jan Pospísil presents a survey of "functionalised" polymers, i.e. polymers containing an effective antioxidant, antiozonant, metal deactivator, light stabiliser or biostabiliser group. EP-A 306 729 discloses antioxidants bound to polymers, said polymers being obtained by reacting an anhydride-functionalised polymer with a hydrazide-functionalised antioxidant or with a copolymer consisting of N-substituted imides of cyclic α,β-unsaturated dicarboxylic acid anhydrides (with antioxidant function) and ethylenic or vinylic aromatic monomers.

Stabilising plastic compositions against heat and light poses a special problem because, depending on the polarity of the components, a nonuniform distribution of the stabiliser compounds is obtained in the polyphase polymer system (stabiliser partitioning). This is described, inter alia, by D. M. Kulich, M. D. Wolkowicz and J. C. Wozny in *Makromol. Chem., Macromol. Symp.* 70/71, 407–418 (1993). The distribution equilibrium of the stabilisers is additionally influenced by the compatibilisers used which are moreover often the least stable component of the composition. Thermal or photooxidative damage of the compatibiliser then results in a very rapid breakdown of the entire composition because the compatibilising component is impaired.

Accordingly, it is desirable to provide compounds which improve the compatibility of the components in polymer blends as well as the mechanical properties and which also ensure protection against oxidative and photooxidative damage.

It has now been found that specific polymers with corresponding stabiliser side groups possess these properties.

Accordingly, this invention relates to a process for stabilising and at the same time phase compatibilising plastics or plastic compositions by incorporating polymeric compounds obtainable by reacting a compound selected from the group consisting of the sterically hindered phenols, sterically hindered amines, lactones, sulfide, phosphites, benzotriazoles, benzophenones and 2-(2-hydroxyphenyl)-1,3,5-triazines, which compounds contain at least one functional reactive group, with a compatibiliser.

Suitable sterically hindered phenols which contain at least one reactive group and which are reacted with the compatibiliser compound are compounds of formula I

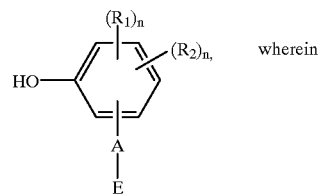

wherein $R_1$ and $R_2$ are each independently of the other hydrogen, $C_1-C_{25}$alkyl, phenyl-$C_1-C_3$alkyl which is unsubstituted or substituted once or several times at the aromatic ring by OH or/and $C_1-C_4$alkyl, unsubstituted or $C_1-C_4$alkyl-substituted $C_5-C_{12}$cycloalkyl, or phenyl; n is 1, 2 or 3;

E is OH, SH, $NHR_3$, $SO_3H$, COOH, —CH=$CH_2$,

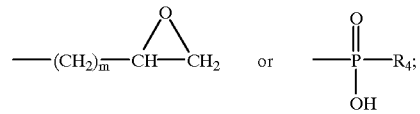

m is 0 or 1;

$R_3$ is hydrogen or $C_1-C_9$alkyl;

$R_4$ is $C_1-C_{12}$alkyl, or phenyl which is unsubstituted or substituted by one or several $C_1-C_4$-alkyl, halogen or/and $C_1-C_{18}$alkoxy;

A if E is OH, SH or —CH=$CH_2$, is —$C_xH_{2x}$—, —$CH_2$—S—$CH_2CH_2$—, —$C_qH_{2q}$—(CO)—O—$C_pH_{2p}$—, —$C_qH_{2q}$—(CO)—NH—$C_pH_{2p}$— or —$C_qH_{2q}$—(CO)—O—$C_pH_{2p}$—S—$C_qH_{2q}$—;

x is a number from 0 to 8;

p is a number from 2 to 8;
q is a number from 0 to 3;
$R_1$ and n are as defined above; or A if E is —$NHR_3$, is —$C_xH_{2x}$— or —$C_qH_{2q}$—(CO)—NH—$C_pH_{2p}$—, wherein x,p and q have the meanings cited above; or A if E is COOH or $SO_3H$, is —$C_xH_{2x}$—, —$CH_2$—S—$CH_2$— or —$CH_2$—S—$CH_2CH_2$—, wherein x has the meaning cited above; or A if E is

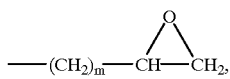

is a direct bond, —$C_qH_{2q}$—(CO)$_m$—O—$CH_2$— or —$C_xH_{2x}$—S—$CH_2$—, wherein q, m, x, $R_1$ and $R_2$ are as defined above;

A if E is

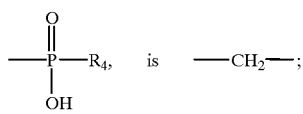

$C_1$–$C_{25}$alkyl is linear or branched and is typically $C_1$–$C_{20}$-, $C_1$–$C_{18}$-, $C_1$–$C_{12}$-, $C_1$–$C_9$-, $C_1$–$C_6$- or $C_1$–$C_4$alkyl. Typical examples are methyl, ethyl, propyl, isopropyl, n-butyl, sec-butyl, iso-butyl, tert-butyl, pentyl, 1,1-dimethylpropyl, hexyl, heptyl, 2,4,4-trimethyl-pentyl, 2-ethylhexyl, octyl, nonyl, decyl, undecyl, dodecyl, tetradecyl, pentadecyl, hexadecyl, heptadecyl, octadecyl, nonadecyl, icosyl, docosyl or pentacosyl.

$C_1$–$C_9$Alkyl and $C_1$–$C_4$alkyl have, for example, the meanings cited above up to the corresponding number of carbon atoms.

$C_2$–$C_6$Alkenyl radicals can be mono- or polyunsaturated and are typically allyl, methallyl, 1,1-dimethylallyl, 1-butenyl, 3-butenyl, 2-butenyl, 1,3-pentadienyl or 5-hexenyl. Allyl is preferred. $R_3$ defined as $C_2$–$C_6$alkenyl is, for example, $C_2$–$C_4$alkenyl.

$C_1$–$C_4$Alkoxy is a linear or branched radical and is methoxy, ethoxy, propoxy, isopropoxy, n-butyloxy, sec-butyloxy, iso-butyloxy or tert-butyloxy.

Phenyl-$C_1$–$C_3$alkyl is typically benzyl, phenylethyl, α-methylbenzyl or α,α-dimethyl-benzyl. Benzyl is preferred.

$C_5$–$C_{12}$Cycloalkyl is typically cyclopentyl, cyclohexyl, cyclooctyl, cyclododecyl, in particular cyclopentyl and cyclohexyl, preferably cyclohexyl. $C_1$–$C_4$Alkyl-substituted $C_5$–$C_{12}$cycloalkyl is typically 1-methylcyclohexyl.

Halogen is fluoro, chloro, bromo and iodo, in particular chloro and bromo, preferably chloro.

Mono- or polysubstituted phenyl is typically substituted one to five times, for example one, two or three times, preferably one or two times, at the phenyl ring.

Substituted phenyl is, for example, substituted by linear or branched $C_1$–$C_4$alkyl, such as methyl, ethyl, n-propyl, i-propyl, n-butyl, i-butyl, s-butyl or t-butyl, or by linear or branched $C_1$–$C_4$alkoxy, such as methoxy, ethoxy, n-propoxy, i-propoxy, n-butoxy, i-butoxy, s-butoxy or t-butoxy, or by halogen, such as fluoro, chloro, bromo or iodo.

Phenyl is preferably substituted by, in particular, methyl, t-butyl, methoxy, and chloro.

Suitable compounds are those of formula I, wherein $R_1$ and $R_2$ are $C_1$–$C_4$alkyl.

Other compounds to be mentioned are those of formula I, wherein $R_1$ and $R_2$ are in ortho-position to the phenolic OH group.

Particularly suitable compounds are those, wherein A is —$C_xH_{2x}$—, typically 6-tert-butyl-2,4-dimethyl-3-hydroxymethylphenol, 2,6-di-tert-butyl-4-(3-hydroxypropyl)phenol or 2,6-di-tert-butyl-4-(2,2-dimethyl-3-hydroxypropyl)phenol.

x is typically a number from 0 to 6, preferably from 0 to 4.

Those compounds of formula I also merit mention, wherein A is a group —$CH_2$—S—$CH_2$— or —$CH_2$—S—$CH_2CH_2$—, typically 2,6-di-tert-butyl4-(4-hydroxy-2-thiabut-1-yl)phenol or 6-tert-butyl-2,4-dimethyl-3-(4-hydroxy-2-thiabut-1-yl)phenol.

Other important compounds of formula I are those, wherein A is —$C_qH_{2q}$—(CO)—O—$C_pH_{2p}$—, p is a number from 2 to 5, and q is 1 to 2, such as

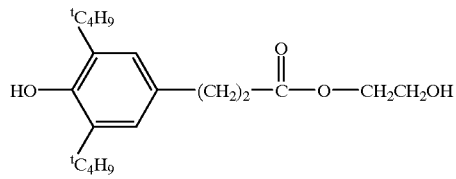

or

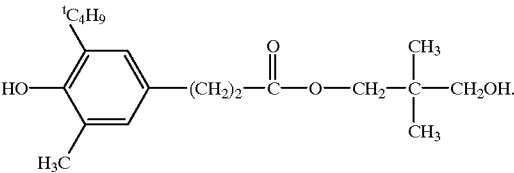

Other suitable compounds are

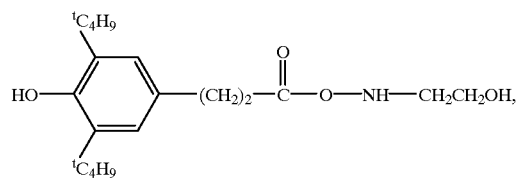

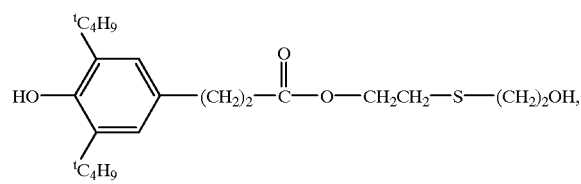

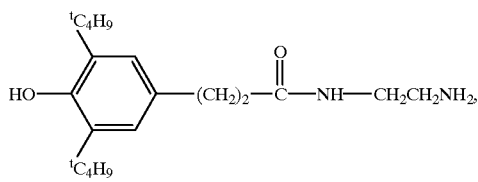

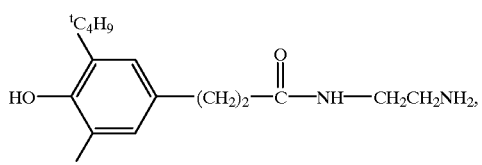

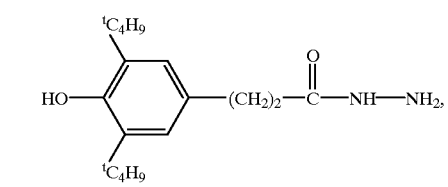

2,6-di-tert-butyl-4-(3-aminopropyl)phenol, 2,6-di-tert-butyl-4-(2,2-dimethyl-2-amino-ethyl)phenol or 2,4,6-trimethyl-3-aminomethylphenol.

If E is COOH, x is preferably 2 or 3.

Preferred compounds are, for example, 2,6-di-tert-butyl-4-(2-carboxyethyl)phenol, 2-tert-butyl-6-methyl4-(2-carboxyethyl)phenol and 2,6-di-tert-butyl-4-(3-carboxy-2-thiaprop-1-yl)-phenol.

If E is

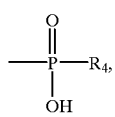

$R_4$ is e.g. $C_1$–$C_4$alkyl, preferably methyl or ethyl, such as

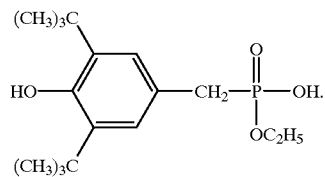

Particularly preferred examples of compounds of formula I with epoxy function are

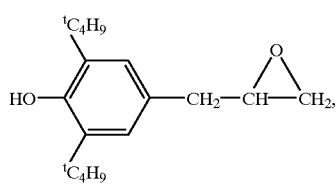

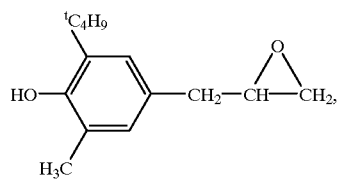

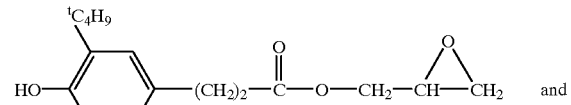

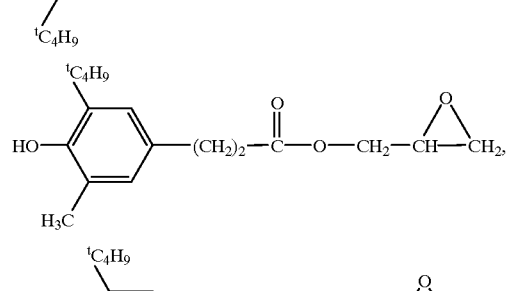

wherein x is as defined above.

Particularly preferred examples of compounds of formula I with OH—, SH— or $NHR_3$ function are

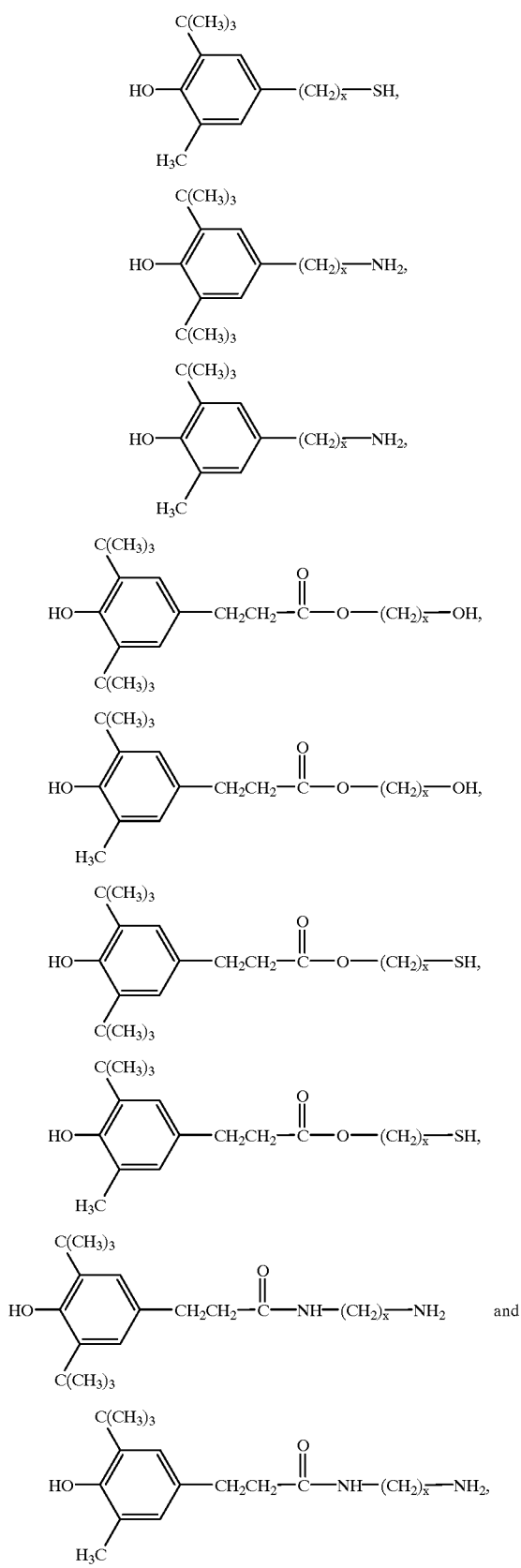

wherein x is a number from 1 to 8.

The preparation of sterically hindered phenols is known to the skilled person and is described, inter alia, in DE-A-42 13 750, DE-A-25 12 895, EP-A-463 835, U.S. Pat. No. 5,189, 088, DE-A-24 14 417, U.S. Pat. No. 4,919,684, DE-A-42 42 916, DE-A-20 37 965 and in numerous other publications.

Suitable sterically hindered amines which contain at least one reactive group and which are reacted with the compatiliser compound are the compounds of formula II, IIa or IIb $R_8$ is hydrogen, $C_1$–$C_{25}$alkyl, $C_2$–$C_{20}$alkenyl, $C_2$–$C_{20}$alkynyl, $C_1$–$C_{20}$alkoxy, phenyl-$C_1$–$C_3$alkyl, $C_5$–$C_{12}$cycloalkyl, $C_5$–$C_8$cycloalkoxy, phenyl, naphthyl, hydroxyethyl, CO—$C_1$–$C_{25}$alkyl, CO-phenyl, CO-naphthyl, CO-phenyl-$C_1$–$C_3$alkyl, O—CO—$C_1$–$C_{20}$alkyl or $C_1$–$C_6$alkyl-S—$C_1$–$C_6$alkyl, $C_1$–$C_6$alkyl-O—$C_1$–$C_6$alkyl, $C_1$–$C_6$alkyl-(CO)—$C_1$–$C_6$alkyl, —CH$_2$CH$_2$—O—CH$_2$—CH—CH$_2$   or   —CH$_2$—CH—CH$_2$;

w is a number from 1 to 10;

Y is a single bond, $C_1$–$C_{25}$alkylene, phenylene, biphenylene, naphthylene, —O—$C_1$–$C_{25}$alkylene, —NR$_9$—, —O— or —N—$C_1$–$C_{25}$-alkylene;

Z is hydrogen, —COOR$_9$, —NH$_2$, —OR$_9$, hydroxyethyl,

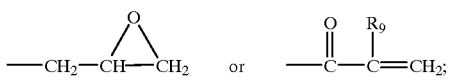

R$_9$ is hydrogen or C$_1$–C$_{12}$alkyl;

R$_{10}$ has the same definition as R$_8$.

C$_1$–C$_{25}$Alkyl, phenyl—C$_1$–C$_3$alkyl and C$_5$–C$_{12}$cycloalkyl have, for example, the meanings given above for formula I. C$_1$–C$_{12}$Alkyl also has these meanings up to the corresponding number of carbon atoms.

C$_1$–C$_{25}$Alkylene is linear or branched, such as methylene, ethylene, propylene, isopropylene, n-butylene, sec-butylene, iso-butylene, tert-butylene, pentylene, hexylene, heptylene, octylene, nonylene, decylene, dodecylene, tetradecylene, heptadecylene or octadecylene. Y is in particular C$_1$–C$_{12}$alkylene, for example C$_1$–C$_8$alkylene, preferably C$_1$–C$_4$alkylene.

Particularly preferred examples of compounds of formula II with epoxy function are

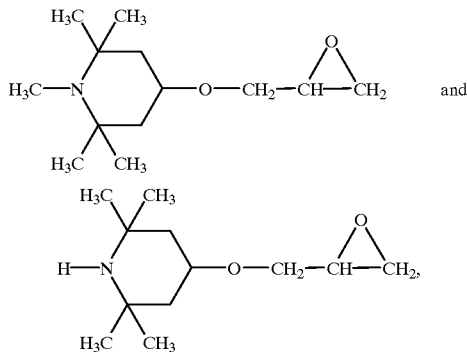

and also

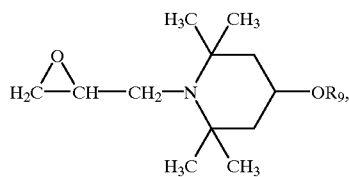

wherein R$_9$ is C$_1$–C$_{12}$alkyl.

Particularly preferred examples of compounds of formula II with OH— or NH$_2$ function are

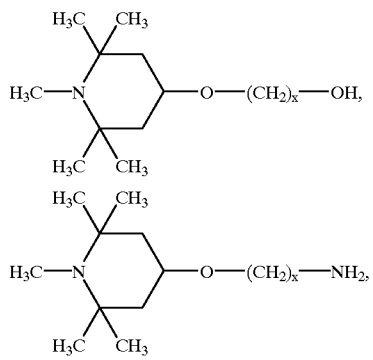

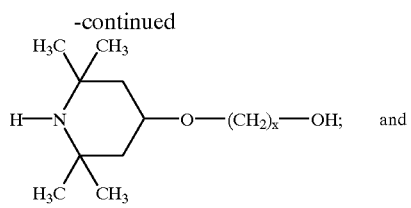

and

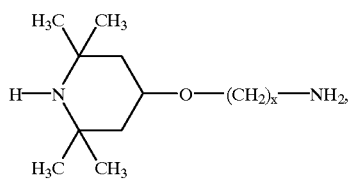

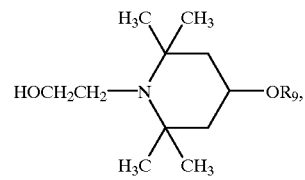

wherein x is a number from 1 to 8, and wherein R$_9$ is C$_1$–C$_{12}$alkyl.

The skilled person is familiar with the preparation of suitable sterically hindered amine compounds, which is described, inter alia, in EP-A-634 450, EP-A-634 449, EP-A-434 608, EP-A-389 419, EP-A-0 634 399, EP-A-0 001 835 or by Luston and Vass, Makromolekulare Chemie, Macromol. Symp. 27, 231 (1989) and other publications.

Suitable lactones which contain at least one reactive group and which are reacted with the compatibiliser compound are compounds of formula III

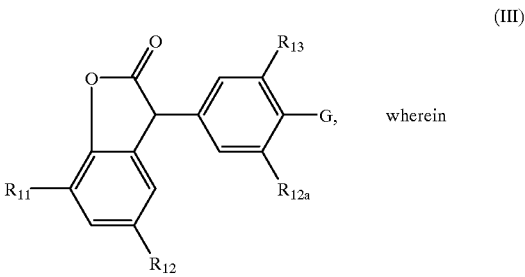

wherein

R$_{11}$, R$_{12}$, R$_{12a}$ and R$_{13}$ are each independently of one another hydrogen, C$_1$–C$_{25}$alkyl, phenyl-C$_1$–C$_3$alkyl, C$_5$–C$_{12}$cycloalkyl or phenyl; and G is OH,

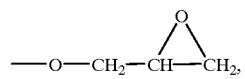

—OCH$_2$CH$_2$OH or —OCH$_2$COOH.

The meanings of C$_1$–C$_{25}$alkyl, C$_1$–C$_{12}$alkyl, phenyl-C$_1$–C$_3$alkyl, C$_5$–C$_{12}$-cycloalkyl and C$_1$–C$_{25}$alkylene correspond to those given for formulae I, II and IIa.

Preferred compounds are those of formula III wherein G is a radical OH.

Particularly suitable compounds of formula III are those, wherein $R_{11}$, $R_{12}$, $R_{12a}$ and $R_{13}$ are hydrogen, $C_1$–$C_{10}$alkyl, phenyl-$C_1$–$C_3$alkyl or cyclohexyl.

$R_{11}$, $R_{12}$, $R_{12a}$ and $R_{13}$ are preferably $C_1$–$C_4$alkyl, in particular methyl and tert-butyl.

Preferred examples of compounds of formula IIl1 are, for example,

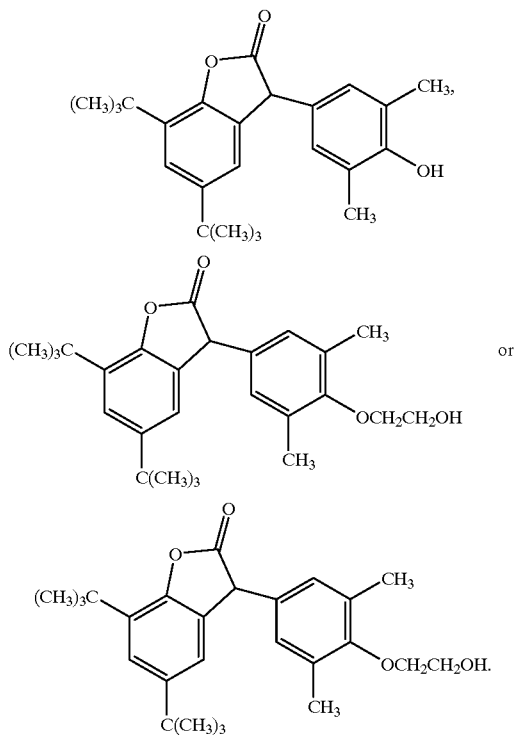

or

It is also possible to use mixtures of positional isomeric compounds.

The preparation of suitable lactones is known to the skilled person and is described, inter alia, in EP-A-591 102 and other publications.

Suitable sulfides which contain at least one reactive group and which are reacted with the compatibiliser compound are compounds of formula IV

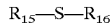   (IV), wherein $R_{15}$ is $C_1$–$C_{18}$alkyl, benzyl, phenyl or

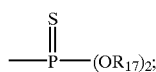

and $R_{16}$ is —$CH_2CH_2OH$,

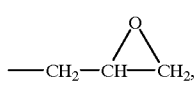

—$CH_2COOH$ or —$CH_2CH_2COOH$; and $R_{17}$ is $C_1$–$C_{18}$alkyl or unsubstituted or $C_1$–$C_4$alkyl-substituted phenyl.

The meanings of $C_1$–$C_{18}$alkyl and of $C_1$–$C_4$alkyl-substituted phenyl are the same as those given above for formula I.

$R_{15}$ is preferably $C_8$–$C_{12}$alkyl, benzyl or phenyl, in particular $C_8$–$C_{12}$alkyl. $R_{16}$ is preferably —$CH_2CH_2OH$ or

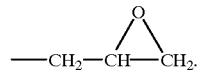

Typical examples are

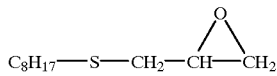

or

Also suitable are compounds of formula IV, wherein $R_{15}$ is

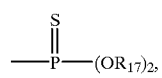

preferably

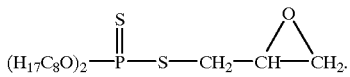

The preparation of suitable sulfides is known to the skilled person and is described, inter alia, in Abh. Akad. Wiss. DDR Abt. Math., Naturwiss., Tech. (1987), Vol. October 1986 (IN), 511–5; EP-A-166 695, EP-A-413 562 and other publications.

Suitable phosphites which contain at least one reactive group and which are reacted with the compatibiliser compound are compounds of formula V

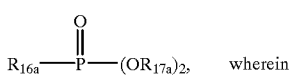   (V)

$R_{16a}$ is —$CH_2CH_2OH$ or —$CH_2CH_2COOH$; and $R_{17a}$ is $C_1$–$C_{18}$alkyl or unsubstituted or $C_1$–$C_4$alkyl-substituted phenyl.

The meanings of $C_1$–$C_{18}$alkyl and of $C_1$–$C_4$alkyl-substituted phenyl are the same as those given above for formula I.

Particularly suitable phosphites are those of formula

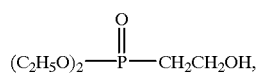

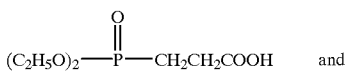   and

-continued

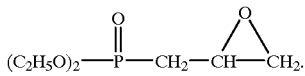

The skilled person is familiar with the preparation of suitable phosphites which is described, inter alia, in Khim.-Famy. Zh. (1988),22(2), 170–4 and other publications.

Suitable benztriazoles, benzophenones and 2-(2-hydroxyphenyl)-1,3,5-triazines which contain at least one reactive group and which are reacted with the compatibiliser compound are compounds of formula VI, VIa, VIb or VIc

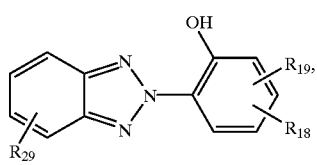
(VI)

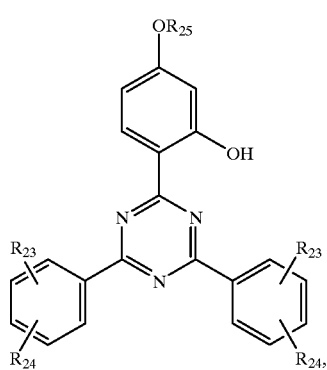
(VIa)

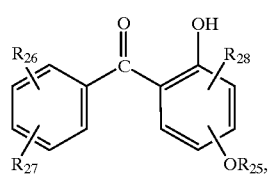
(VIb)

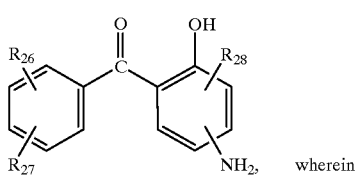
(VIc)

wherein $R_{18}$ is —(CH$_2$)$_t$—$R_{20}$,

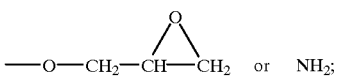

$R_{19}$ is C$_1$–C$_{12}$alkyl, α,α-dimethylbenzyl or a radical

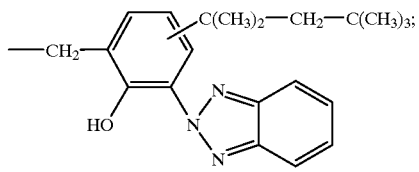

$R_{20}$ is —OH, —SH, —NHR$_{30}$, —SO$_3$H, —COOR$_{21}$, —CH=CH$_2$,

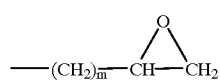

or —(CO)—NH—(CH$_2$)$_u$—NCO;

$R_{21}$ is hydrogen,

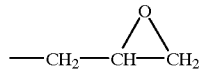

or —C$_2$—CH(OH)—CH$_2$—O—(CO)—R$_{22}$;

$R_{22}$ is C$_1$–C$_4$alkyl or phenyl;

$R_{23}$ and $R_{24}$ are each independently of the other hydrogen or C$_1$–C$_4$alkyl;

$R_{25}$ is hydrogen, —(CH$_2$)$_u$—OH,

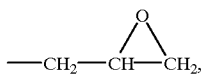

—(CH$_2$)$_u$COOH or —(CO)—NH—(CH$_2$)$_u$—NCO;

$R_{26}$ is hydrogen, OH or C$_1$–C$_{12}$alkoxy;

$R_{27}$ is hydrogen or OH;

$R_{28}$ is hydrogen or

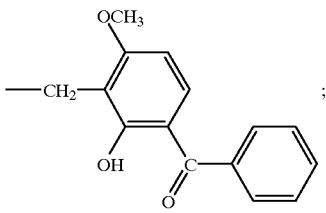

$R_{29}$ is hydrogen or halogen;

$R_{30}$ is hydrogen or C$_1$–C$_9$alkyl;

m is 0 or 1;

t is a number from 0 to 6;

u is a number from 2 to 12.

C$_1$–C$_4$Alkyl is typically linear or branched and is methyl, ethyl, propyl, isopropyl, n-butyl, sec-butyl, iso-butyl or tert-butyl. Methyl is preferred.

Particularly suitable compounds are, for example, hydroxy-substituted benzophenones such

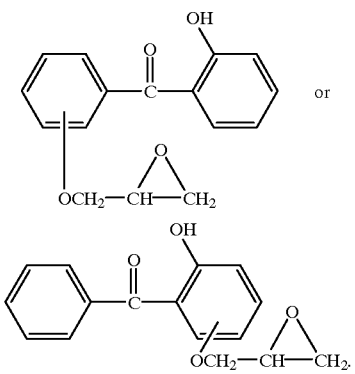

or

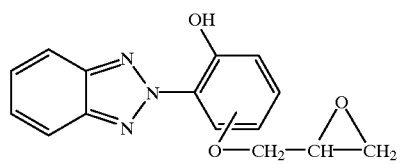

These compounds can be further substituted at the aromatic rings, for example with additional hydroxyl groups or alkoxy.

Benzotriazoles of formula

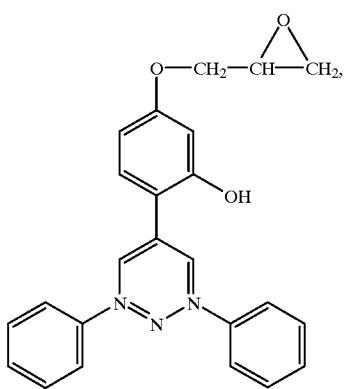

are also suitable. In addition to the epoxy-functionalised radical, the hydroxyphenyl group can also contain alkyl substituents.

Particularly suitable triazine compounds are, for example, those of formula

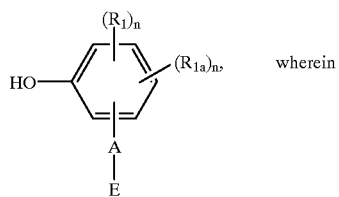

wherein the phenyl groups can additionally be substituted by methyl.

The preparation of suitable benztriazoles is known to the skilled person and is described, inter alia, in EP-A-693 483; Polymer (1 995), 36(17), 3401–8 and other publications. The preparation of suitable 2-(2-hydroxyphenyl)-1,3,5-triazilnes is known to the skilled person and is described, inter alia, in EP-A-434 608; CA-A-2062217 and other publications. The preparation of suitable benzophenones is known to the skilled person and is described, inter alia, in EP-A-693 483; EP-A-538 839; Zh. Prikl. Khim. (Leningrad) (1976), 49(5), 1129–34; JP-A- Hei 3 31235 (=Chemical Abstract No. 115:49102) and other publications.

This invention also relates to compounds which are obtainable by reacting sterically hindered phenols of formula I

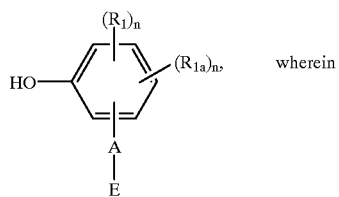

(I)

wherein $R_1$ and R2 are each independently of the other hydrogen, $C_1$–$C_{25}$alkyl, phenyl-$C_1$–$C_3$alkyl which is unsubstituted or substituted once or several times at the aromatic ring by OH or/and $C_1$–$C_4$alkyl, unsubstituted or $C_1$–$C_4$alkyl-substituted $C_5$–$C_{12}$cycloalkyl, or phenyl;

n is 1, 2 or 3;

E is OH, SH, $NHR_3$, $SO_3H$, COOH, —CH=$CH_2$,

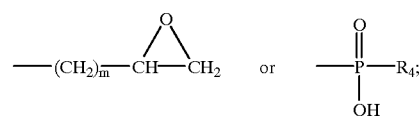

m is 0 or 1;

$R_3$ is hydrogen or $C_1$–$C_9$alkyl;

$R_4$ is $C_1$–$C_{12}$alkyl, phenyl which is unsubstituted or substituted by one or several $C_1$–$C_4$-alkyl, halogen or/and $C_1$–$C_{18}$alkoxy;

A if E is OH, SH or —CH=$CH_2$, is —$C_xH_{2x}$—, —$CH_2$—S—$CH_2CH_2$—, —$C_qH_{2q}$—(CO)—O—$C_pH_{2p}$—, —$C_qH_{2q}$—(CO)—NH—$C_pH_{2p}$— or —$C_qH_{2q}$—(CO)—O—$C_pH_{2p}$—S—$C_qH_{2q}$—;

x is a number from 0 to 8;

p is a number from 2 to 8;

q is a number from 0 to 3;

$R_1$ and n are as defined above; or

A if E is —$NHR_3$, is —$C_xH_{2x}$— or —$C_qH_{2q}$—(CO)—NH—$C_pH_{2p}$—, wherein x, p and q have the meanings cited above; or A if E is COOH or $SO_3H$, is —$C_xH_{2x}$—, —$CH_2$—S—$CH_2$— or —$CH_2$—S—$CH_2CH_2$—, wherein x has the meaning cited above; or A if E is

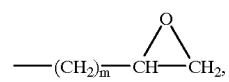

is a direct bond, —$C_qH_{2q}$—(CO)—O—$CH_2$— or —$C_xH_{2x}$—S—$CH_2$—, wherein q, m, x, $R_1$ and $R_2$ are as defined above;

A if E is

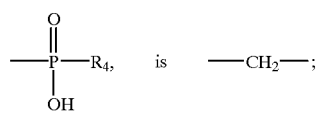

is —$CH_2$—;

or sterically hindered amines of formula II, IIa or IIb

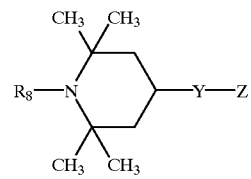
(II)

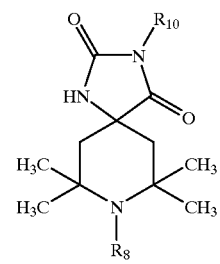
(IIa)

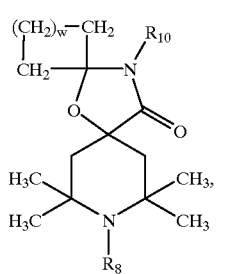
(IIb)
wherein $R_8$ is hydrogen, $C_1$–$C_{25}$alkyl, $C_2$–$C_{20}$alkenyl, $C_2$–$C_{20}$alkynyl, $C_1$–$C_{20}$alkoxy, phenyl-$C_1$–$C_3$alkyl, $C_5$–$C_{12}$cycloalkyl, $C_5$–$C_8$cycloalkoxy, phenyl, naphthyl, hydroxyethyl, CO—$C_1$–$C_{25}$alkyl, CO-phenyl, CO-naphthyl, CO-phenyl-$C_1$–$C_3$alkyl, O—CO—$C_1$–$C_{20}$alkyl or $C_1$–$C_6$alkyl—S—$C_1$–$C_6$alkyl, $C_1$–$C_6$alkyl-O—$C_1$–$C_6$alkyl, $C_1$–$C_6$alkyl-(CO)—$C_1$–$C_6$alkyl,

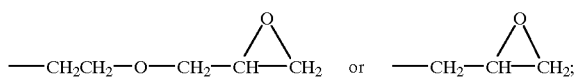

w is a number from 1 to 10;

Y is a single bond, $C_1$–$C_{25}$alkylene, phenylene, biphenylene, naphthylene, —O—$C_1$–$C_{25}$alkylene, —$NR_9$—, —O— or

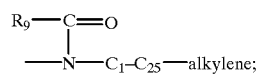

Z is hydrogen, —$COOR_9$, —$NH_2$, —$OR_9$, hydroxyethyl,

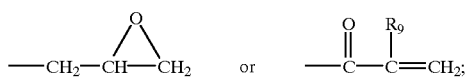

$R_9$ is hydrogen or $C_1$–$C_{12}$alkyl;

$R_{10}$ has the same definition as $R_8$;

or lactones of formula III

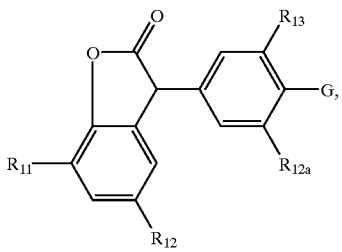
(III)

wherein $R_{11}$, $R_{12}$, $R_{12a}$ and $R_{13}$ are each independently of one another hydrogen, $C_1$–$C_{25}$alkyl, phenyl-$C_1$–$C_3$alkyl, $C_5$–$C_{12}$cycloalkyl or phenyl; and G is OH, $OCH_2CH_2OH$,

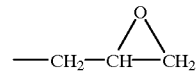

or —$OCH_2COOH$; or sulfides of formula IV $$R_{15}\text{—S—}R_{16} \quad (IV),$$

wherein $R_{15}$ is $C_1$–$C_{18}$alkyl, benzyl, phenyl or

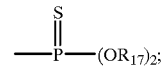

and $R_{16}$ is —$CH_2CH_2OH$,

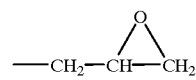

—$CH_2COOH$ or —$CH_2CH_2COOH$; and $R_{17}$ is $C_1$–$C_{18}$alkyl or unsubstituted or $C_1$–$C_4$alkyl-substituted phenyl;

or phosphites of formula V

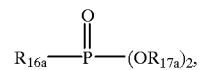
(V)

wherein $R_{16a}$ is —$CH_2CH_2OH$ or —$CH_2CH_2COOH$; and $R_{17a}$ is $C_1$–$C_{18}$alkyl or unsubstituted or $C_1$–$C_4$alkyl-substituted phenyl;

or benzotriazoles, benzophenones or 2,4,6-triaryl-1,3,5-triazines of formula VI, VIa, VIb or VIc

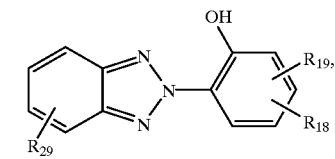

(VI)

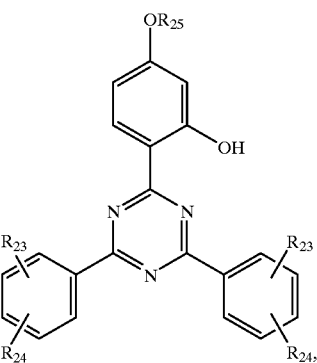

(VIa)

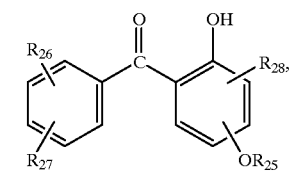

(VIb)

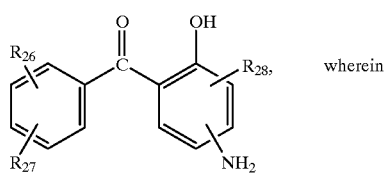

wherein $R_{18}$ is —(CH$_2$)$_t$—R$_{20}$,

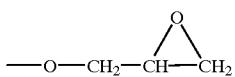

or NH$_2$;

$R_{19}$ is $C_1$–$C_{12}$alkyl, α,α-dimethylbenzyl or a radical

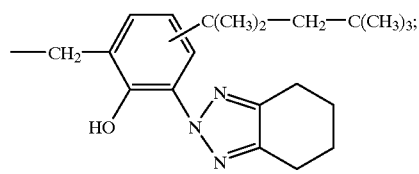

$R_{20}$ is —OH, —SH, —NHR$_{30}$, —SO$_3$H, —COOR$_{21}$, —CH=CH$_2$,

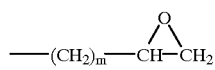

or —(CO)—NH—(CH$_2$)$_u$—NCO;

$R_{21}$ is hydrogen,

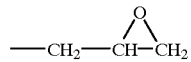

or —CH$_2$—CH(OH)—CH$_2$—O—(CO)—R$_{22}$;

$R_{22}$ is $C_1$–$C_4$alkyl or phenyl;

$R_{23}$ and $R_{24}$ are each independently of the other hydrogen or $C_1$–$C_4$alkyl;

$R_{25}$ is hydrogen, —(CH$_2$)$_u$—OH,

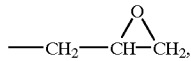

—CH(CH$_2$)$_u$COOH or —(CO)—NH—(CH$_2$)$_u$—NCO;

$R_{26}$ is hydrogen, OH or $C_1$–$C_{12}$alkoxy;

$R_{27}$ is hydrogen or OH;

$R_{28}$ is hydrogen or

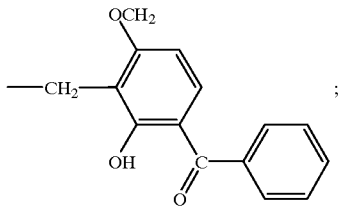

$R_{29}$ is hydrogen or halogen;

$R_{30}$ is hydrogen or $C_1$–$C_9$alkyl;

m is 0 or 1;

t is a number from 0 to 6;

u is a number from 2 to 12;

with a compatibiliser compound.

To prepare the novel compounds, compatibilisers with specific reactive groups are suitable. These compatibilisers are polymers containing acid groups, acid anhydride groups, ester groups, epoxy groups or alcohol groups. Copolymers or terpolymers of polyethylene, polypropylene, vinyl acetate or styrene with acrylates are also suitable.

Typical examples are polymers with acrylic acid (AA) function, glycidyl methacrylate (GMA) function, methacrylic acid (MAA) function, maleic anhydride (MAH) function or vinyl alcohol (VA) function.

Preferred compatibilisers are, for example, copolymers consisting of polyethylene acrylic acid (PE-AA), polyethylene glycidyl methacrylate (PE-GMA), polyethylene methacrylic acid (PE-MAA), polyethylene maleic anhydride (PE-MAH) or terpolymer of polyethylene and vinyl acetate with acrylates (e.g. PE-AA-acrylate).

Also suitable as compatibilisers are grafted polyethylene or polypropylene copolymers selected from the group consisting of maleic anhydride grafted to polyethylene vinyl acetate (MAH-g-PE-vinyl acetate), maleic anhydride grafted to low density polyethylene (MAH-g-LDPE), maleic anhydride grafted to high density polyethylene (MAH-g-HDPE), maleic anhydride grafted to linear low density polyethylene (MAH-g-LLDPE), acrylic acid grafted to polypropylene (AA-g-PP), glycidyl methacrylate grafted to polypropylene (GMA-g-PP), maleic anhydride grafted to polypropylene (MAH-g-PP), maleic anhydride grafted to ethylene/propylene terpolymer (MAH-g-EPDM), maleic anhydride grafted to ethylene/propylene rubber (MAH-g-EPM) and maleic anhydride grafted to polyethylene/polypropylene copolymer (MAH-g-PE/PP).

Other suitable compatibiliser components are grafted styrene co- or terpolymers selected from the group consisting of styrene/acrylonitrile grafted with maleic anhydride (SAN-g-MAH), styrene/maleic anhydride/methyl methacrylate, styrene/butadiene/styrene block copolymer grafted with maleic anhydride (SBS-g-MAH), styrene/ethylene/propylene/styrene block copolymer grafted with maleic anhydride (SEPS-g-MAH), styrene/ethylene/butadiene/styrene block copolymer grafted with maleic anhydride (SEPS-g-MAH) and acrylic acid/polyethylene/polystyrene terpolymer (AA-PE-PS-terpolymer).

Important compatibilisers are those containing anhydride units. Illustrative examples of suitable anhydrides are itaconic acid anhydride, citraconic acid anhydride, bicyclo[2.2.2]-5-octene-2,3-dicarboxylic acid anhydride, bicyclo[2.2.1]-5-heptene-2,3-dicarboxylic acid anhydride or maleic anhydride. Maleic anhydride is preferred.

Particularly suitable as compatibilisers are copolymers or terpolymers having one anhydride. Typical examples are ethylene/vinyl acetate/maleic anhydride terpolymers, ethylene/ethylacrylate/maleic anhydride terpolymers, ethylene/acrylic acid/ maleic anhydride terpolymers, styrene/maleic anhydride copolymer or styrene/maleic anhydride/methyl methacrylate terpolymer.

Such polymers and their preparation are known and are described, inter alia, by P. J. Flory in Principles of Polymer Chemistry, 1964, Cornell University Press, Ithaca, N.Y., as well as in Compatibilizers and polymer modifiers for virgin and recycled thermoplastics including multipolymer and multilayer materials, Maack Business Services, Study MBS No. 10, September 1990, Zürich.

Also preferred as compatibiliser component are copolymers or terpolymers containing a grafted anhydride, such as maleic anhydride grafted to polypropylene, maleic anhydride grafted to polyethylene, maleic anhydride grafted to ethylene/vinylacetate copolymer, styrene/ethylene/propylene/styrene block copolmer (SEPS), styrene/ethylene/butylene/styrene block copolmer (SEBS), maleic anhydride grafted to ethylene/propylene terpolymer (EPDM), maleic anhydride grafted to ethylene/propylene copolymer.

Such graft polymers and their preparation are known and are described, inter alia, in H.-G. Elias, Makromoleküle 1981, Hüthig & Wepf Verlag Heidelberg; or in Compatibilizers and polymer modifiers for virgin and recycled thermoplastics including multipolymer and multilayer materials, Maak Business Services, Study MBS No. 10, September 1990, Zürich; as well as in M. Xanthos, Reactive Extrusion, 1992, Oxford University Press, NY.

The maleic anhydride content is typically from 0.05–15%, preferably from 0.1–10%.

Also suitable as compatibiliser component are copolymers or terpolymers containing unsaturated carboxylic acid, typically acrylic acid, methacrylic acid, crotonic acid, fumaric acid, vinyl acetic acid, maleic acid, itaconic acid. Acrylic acid, methacrylic acid, fumaric acid and maleic acid are preferred, and acrylic acid and methacrylic acid are particularly preferred. Illustrative examples of such copolymers or terpolymers are ethylene/acrylic acid copolymer, propylene/acrylic acid copolymer or ethylenelpropylene/acrylic acid terpolymer. Such polymers and their preparation are described, inter alia, in Compatibilizers and polymer modifiers for virgin and recycled thermoplastics including multipolymer and multilayer materials, Maak Business Services, Study MBS No. 10, September 1990, Zürich.

The acrylic acid content is typically from 0.1–30%, preferably from 0.1–25%.

The preparation of the polymeric, copolymeric and terpolymeric compatibilisers is carried out by conventional polymerisation processes with which the skilled person is familiar.

The preparation of carboxyl group-containing polymers has been published, for example, by N. G. Gaylord in "Reactive Extrusion; Principles and Practice", Polymer Processing Institute, page 56 et seq., Hanser Verlag, München, Wien, New York (1992). In the same work, p. 116 et seq., S. Brown describes the preparation of other carboxylated compatibilisers.

The reaction of the compatibiuiser compound with a compound selected from the group consisting of the sterically hindered phenols, sterically hindered amines, lactones, sulfides, phosphites, benzotriazoles, benzophenones and 2-(2-hydroxyphenyl)-1,3,5-triazines, containing at least one functional reactive group, is carried out as a grafting reaction or polymer- analogous reaction.

The reactions can be carried out in solution or in the melt, depending on the reactants. Different reactors may be used in this case, for example tanks, extruders, mixers and the like. Extrusion is preferred.

The reactive extrusion has been described, inter alia, by M. Xanthos in Reactive Extrusion, Principle and Practice, Polymer Processing Institute, Hanser Verlag, München 1992. The reactants can be fed into the extruder premixed or separate, i.e. via separate feeding devices, and can be reacted in the extruder. Liquid components or low-melting components may also be fed into the extruder via feeding pumps (side channel proportioning). It may also be useful to degas the melt in the extruder, in particular when low molecular products are obtained in the reaction which are then preferably removed. To this purpose the extruder needs to be equipped with a corresponding degassing device. The preparation can be carried out on commercially available single- or twin-screw extruders. Twin-screw extruders are preferred. Compounding is carried out by the customary techniques, for example granulating. It is also possible to prepare and use a masterbatch (concentrate) from this compatibiliser/stabiliser by the methods known in the art.

The ratio of the compatibiliser component to the stabiliser component in the polymer-analogous reactions is, of course, limited by the number of reactive groups present on the compatibiliser component. A suitable compatibiliser/stabiliser weight ratio is 100:0.05 to 100:50, in particular 100:0.1 to 100:25, preferably 100:1 to 100:20.

The novel compatibiliser/stabiliser compounds can be used, for example, for stabilising the following polymers and, in particular, mixtures of such polymers.

1. Polymers of monoolefins and diolefins, for example polypropylene, polyisobutylene, polybut-1-ene, poly-4-methylpent-1-ene, polyisoprene or polybutadiene, as well as polymers of cycloolefins, for instance of cyclopentene or norbornene, polyethylene (which optionally can be crosslinked), for example high density polyethylene (HDPE), low density polyethylene (LDPE), linear low density polyethylene (LLDPE), low density branched polyethylene (VLDPE).

2. Mixtures of the polymers mentioned under 1), for example mixtures of polypropylene with polyisobutylene, polypropylene with polyethylene (for example PP/HDPE, PP/LDPE, PP/HDPE/LDPE, PP/HDPE/LLDPE/LDPE) and mixtures of different types of polyethylene (for example LDPE/HDPE, LLDPE/LDPE, HDPE/LLDPE/LDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers and their copolymers with carbon monoxide or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers, LDPE/ethylene-acrylic acid copolymers, LLDPE/ethylene-vinyl acetate copolymers, LLDPE/ethy-lene-acrylic acd copolymers and alternating or random polyalkylene/carbon monoxide copolymers and mixtures thereof with other polymers, for example polyamides.

4. Polystyrene, poly(p-methylstyrene), poly(α-methylstyrene).

5. Copolymers of styrene or α-methylstyrene with dienes or acrylic derivatives, for example styrene/butadiene, styrene/acrylonitrile, styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/ethylene/propylene/styrene.

6. Graft copolymers of styrene or α-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 5), for example the copolymer mixtures known as ABS, MBS, ASA or AES polymers.

7. Halogen-containing polymers such as polychloroprene, chlorinated rubber, chlorinated or chlorosulfonated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate.

8. Polymers derived from α,β-unsaturated acids and derivatives thereof such as polyacrylates and polymethacrylates; polymethyl methacrylates, polyacrylamides and polyacryloni-triles, impact-modified with butyl acrylate.

9. Copolymers of the monomers mentioned under 8) with each other or with other unsaturated monomers, for example acrylonitrile/ butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.

10. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above.

11. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4,-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).

12. Polyesters derived from dicarboxylic acids and diols and/or from hydroxycarboxylic acids or the corresponding lactones, for example polyethylene terephthalate, polybutylene terephthalate, poly-1,4-dimethylolcyclohexane terephthalate and polyhydroxybenzoates, as well as block copolyether esters derived from hydroxyl-terminated polyethers; and also polyesters modified with polycarbonates or MBS.

13. Polycarbonates and polyester carbonates.

14. Blends of the aforementioned polymers (polyblends), for example PP/EPDM, polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PA/LDPE, PE/PET, PS/PE, PS/PP, PS/PE/PP, PE/PP/PET/PS.

The novel compatibiliser/stabiliser compounds are added to the polymer to be stabilised in amounts of 0.5–30%, e.g. of 1–20%, preferably of 2–15% (based on the amount of polymer to be stabilised).

The amounts depend on the one hand on the number of active stabiliser groups in the compounds and, on the other hand, on the requirements of the polymers or polymer blends to be stabilised.

The novel compatibiliser/stabiliser compounds are also used for phase compatibilisation in plastic compositions where they act at the same time as stabilisers. These plastic compositions can be virgin plastic compositions (as described above) or also recyclates.

The novel compatibiliser/stabiliser compounds can, in principle, be used in all incompatible plastic compositions, virgin materials or recyclates or in blends of virgin material and recyclates. The plastic compositions can consist of two or more components. The novel compounds are preferably added to mixtures of polar and nonpolar plastics.

The nonpolar components of plastic compositions are, for example, polyolefins, typically polyethylene (PE) and polypropylene (PP). To be mentioned in particular are low density polyethylene (LDPE), low density linear polyethylene (LLDPE) and high density polyethylene (HDPE), and also copolymers, such as ethylene/propylene (EPM) and ethylene/propylene/diene copolymers (EPDM) as well as ULDPE and MDPE. Such nonpolar plastics also include polystyrene (PS, EPS) and copolymers having a styrene component (e.g. ABS, ASA, HIPS, IPS) and polyvinyl chloride (PVC), as well as copolymers with a predominant vinyl chloride component (e.g. OPE)

The polar components are, for example, polyesters, such as polyethylene terephthalate (PET) or polybutylene terephthalate (PBT), polyamides or polycarbonates.

Mixtures of polyethylene and polypropylene or of polyethylene and polyamide are particularly preferred.

The novel compatibiliser/stabiliser compounds can be used, for example, in recycled plastic compositions comprising 25–100% by weight, preferably 35–95% by weight, e.g. 40–85% by weight, of polyolefins, 0–25% by weight of polystyrene, 0–25% by weight of polyvinyl choride and 0–25% by weight of other thermoplastics. Non-thermoplastic materials may also be obtained in minor amounts in the mixture.

Of the polyolefins, polyethylene (PE), in particular low density polyethylene, usually dominates. Polystyrene (PS) is also understood to be copolymers having a predominant styrene component (e.g. ABS, HIPS), and polyvinyl chloride (PVC) is also understood to be copolymers having a predominant vinyl chloride component (e.g. CPE). Other thermoplastics present in the used material are, in particular, polyethylene terephthalate (PET), and also polyamides, polycarbonate, cellulose acetate and polyvinylidene chloride. Non-thermoplastics materials can be present in minor amounts of up to 5%, typically polyurethanes, formaldehyde resins and phenolic resins or also typical aminoplastics, as well as elastomers such as caoutchouc or rubber. Minor amounts of foreign matter may also be present in used plastics, such as paper, pigments, paint systems, printing inks, adhesives, which are often difficult to remove. Minor amounts of cellulose or fibre materials do not interfere with recycling either.

Blends of the novel compatibiliser/stabiliser compounds may also be added to the plastic compositions to be stabilised and to be made compatible. It is, for example, convenient to use compounds having the same compatibiliser backbone but which are differently functionalised as regards the stabiliser, typically mixtures of compounds having a phenolic anti-oxidant function with compounds having a benzotriazole function, mixtures of compounds having an antioxidant function with compounds having a HALS function, mixtures of compounds having a HALS function with compounds having a UV absorber function or e.g. mixtures of compounds having an antioxidant function with compounds having a HALS function and with compounds having a UV absorber function.

The plastic compositions may additionally be mixed with other additives known to the skilled person. These additional additives are used in the customary amounts and combinations detailed in the relevant literature (e.g. "Plastics Additives", Gächter/Müller, Hanser Verlag, München/Wien/New York, 3rd edition).

The incorporation of the novel compatibiliser/stabiliser compounds into the polymers or polymer blends to be stabilised can be conveniently carried out as follows:

as emulsion or dispersion;
as dry mixture while blending additional components or polymer blends;
by direct addition to the processing apparatus (e.g. calender, mixer, kneader, extruder and the like), or
as solution or melt.

The plastic compositions can be prepared in a manner known per se by mixing the novel compounds and further optional additives with the plastic composition using appliances known per se, such as the above-mentioned processing apparatus. The additional additives can be added singly or in admixture or also in the form of so-called masterbatches.

By adding a suitable monomeric functionalised stabiliser compound and a radical initiator to the plastic composition direct while processing the mixture, i.e. without previous separate preparation of the compatibiliser/stabiliser compound, it is furthermore possible to produce said compatibiliser/stabiliser compound and the compatible plastic composition in one process step. In similar manner it is possible to process a suitable monomeric functionalised stabiliser compound and a corresponding compatibiliser together with the polymer mixture so that the compatibiliser compound reacts with the stabiliser compound without prior processing, an improved compatibilised polymer blend being obtained at the same time.

The plastic compositions obtainable according to this invention can be brought into the desired shape in known manner. Such processes are, for example, grinding, calendering, extruding, injection moulding, sintering or spinning, and also extrusion blow moulding or processing by the plastisol process.

The novel process comprises two different aspects, i.e. two different aims are attained by using the novel polymeric compatibiliser/stabiliser compounds.

On the one hand, polymers are made compatible with each other in blends of different polymers (virgin material or recyclates), which, without compatibilisers, would form several phases, and the polymer is stabilised at the same time.

On the other hand, the stabiliser is made compatible or its solubility in the polymer is enhanced because the polymer backbone of the compatibiliser/stabiliser compound is compatible with the polymer to be stabilised.

This also reduces the migration of the stabiliser from the polymer which is conceivable e.g. in extracting ambient media. This is the case, for example, when said compounds are used for fuel tanks, geotextiles, dry cleaning fibres (e.g. textiles, carpet floors), pipes, applications with foodstuff contact and the like.

The following Examples illustrate the invention in more detail. Here as well as in the remainder of the description and in the claims, parts and percentages are by weight unless otherwise stated.

I. Preparation of the Functionalised Polymers

EXAMPLE A

On a twin-screw extruder (TW 100, of Haake, Germany), an SEBS copolymer (styrene/ethylene/butylene/styrene copolymer) is extruded with maleic anhydride groups (Kraton® FG 1901, of Shell) at a temperature of 210–230° C. (heating zone 1–5) and at 45 rpm with addition of 2% of 2,3-epoxypropyl 3,5-bis(1,1-dimethylethyl)-4-hydroxybenzenepropionate. Subsequest analysis by gas chromatography shows that the additive can no longer be detected in its original form, i.e. it is completely chemically bound to the polymer chain.

EXAMPLE B

In general analogy to Example A, a polyethylene/acrylic acid/acrylate (Lucalen® A 3110 MX, of BASF) is extruded with 2% of 2,3-epoxypropyl 3,5-bis(1,1-dimethylethyl)-4-hydroxybenzenepropionate.

EXAMPLE C

The procedure of Example B is repeated, but using 4% of 2,3-epoxypropyl 3,5-bis(1,1-dimethylethyl)-4-hydroxybenzenepropionate.

EXAMPLE D

In general analogy to Example A, SEBS copolymer with maleic anhydride groups is reacted with 2% of 1,2,2,6,6-pentamethyl-4-(2,3-epoxypropyloxy)piperidine.

EXAMPLE E

In general analogy to Example B, polyethylene/acrylic acid/acrylate is reacted with 2% of 1,2,2,6, 6-pentamethyl-4-(2,3-epoxypropyloxy)piperidine.

EXAMPLES F, G, H

In general analogy to Example E, 4%, 6% and 8% each of 1,2,2,6,6-pentamethyl-4-(2,3-epoxypropyloxy)piperidine are used.

II) Use of the Polymeric Stabilisers

Examples 1–3
(Impact Strength as a Function of Oven Ageing)

To test the products obtained, a mixture of 70% of LDPE, low density polyethylene (Lupolen® 3026 F, of BASF) with polyamide 6 (Ultramid® B 30, pre-dried, of BASF) is compounded with the functionalised compatibilisers prepared in the above Examples at 240° C. and at 75 rpm (twin-screw extruder TW 100, of Haake, Germany), granulated and then injection moulded at 240° C. to test samples. The impact strength of these test samples is determined according to DIN 53 448 as a function of ageing at 100° C. in a circulating air oven.

For comparison purposes, compositions comprising instead of the functionalised compatibilisers the corresponding unfunctionalised compounds were prepared and tested. The tested compositions and the test results are given in the following Table 1. The higher the impact strength value, the more stable the tested composition.

TABLE 1

| Additive | Impact strength [kJ/m$^2$] | | | | | |
|---|---|---|---|---|---|---|
| Ex. 5% each of | 0 h | 500 h | 1000 h | 2500 h | 5000 h | 7725 h |
| — | 292 | 158 | 161 | 113 | 60 | 53 |
| Kraton FG 1901 | 571 | 509 | 458 | 451 | 311 | 241 |
| Lucalen A 3110 MX | 673 | 476 | 361 | 195 | 145 | 112 |

TABLE 1-continued

| Additive | Impact strength [kJ/m$^2$] | | | | | |
|---|---|---|---|---|---|---|
| Ex. 5% each of | 0 h | 500 h | 1000 h | 2500 h | 5000 h | 7725 h |
| 1 cmpd. of Example A | 544 | 503 | 479 | 473 | 448 | 428 |
| 2 cmpd. of Example B | 663 | 581 | 583 | 570 | 538 | 478 |
| 3 cmpd. of Example C | 692 | 580 | 578 | 571 | 538 | 419 |

The values obtained show that the functionalised compatibilisers stabilise the polymer more effectively when aged over a prolonger period of time than the of non-functionalised compatibilisers.

Examples 4–8
(Impact Strength as a Function of Artificial Weathering)

In general analogy to the method described in Examples 1–3, test samples are prepared and their impact strength is determined as a function of artificial weathering. The weatherings are carried out in a Weather-O-meter [Type Ci 65A, of Atlas, BPT (black panel temperature)63° C., RH (relative humidity) 60%, water spray].

The compositions and test results are shown in Table 2.

TABLE 2

| Additive | Impact strength [kJ/m$^2$] | | | |
|---|---|---|---|---|
| Ex. 5% each of | 0 h | 1000 h | 2000 h | 5000 h |
| — | 292 | 99 | 104 | 93 |
| Kraton FG 1901 | 571 | 83 | 52 | 45 |
| Lucalen A 3110 MX | 673 | 122 | 97 | 55 |
| 4 cmpd. of Example D | 569 | 456 | 408 | 283 |
| 5 cmpd. of Example E | 702 | 651 | 503 | 249 |
| 6 cmpd. of Example F | 635 | 588 | 485 | 269 |
| 7 cmpd. of Example G | 668 | 670 | 533 | 362 |
| 8 cmpd. of Example H | 596 | 535 | 476 | 416 |

The values obtained show that the functionalised compatibilisers stabilise the polymer more effectively when weathered over a prolonged period of time than the non-functionalised compatibilisers.

Examples 9–12
(Impact Strength as a Function of Oven Ageing After Extraction)

A mixture of 70% of low density polyethylene (LDPE) (Lupolen® 3026 F, of BASF) with 30% of polyamide 6 (Ultramid® B36, pre-dried, of BASF) is compounded with the novel compatibiliser compounds to be tested at 240° C. and at 75 rpm in a twin-screw extruder. Test samples are then injection moulded at 240° C.

These test samples are stored in an extraction medium:

A) in white spirit for 25 days at room temperature,

B) in water with 1 % of Igepal CO630 (nonoxynol 9) for 2 weeks at 40° C.

The dired test samples are then aged at 100° C. in a circulating air oven. The impact strength is determined according to DIN 53 448 as a function of ageing.

The higher the impact strength value and the less this value diminishes after ageing, the more stable the tested composition. The tested compounds and the test results for the extraction variant A are given in Table 3 and those for variant B are given in Table 4.

TABLE 3

| LDPE/PA6 Ex. 70:30 | Impact strength after extraction in white spirit [kJ/m$^2$] | | | | | |
|---|---|---|---|---|---|---|
| | 0 h | 503 h | 723 h | 1006 h | 1990 h | 4004 h |
| 9  5% of the cmpd. of Ex. B | 535 | 554 | 574 | 582 | 595 | 538 |
| 10 5% of the cmpd. of Ex. C | 547 | 542 | 557 | 541 | 567 | 515 |

TABLE 4

| LDPE/PA6 Ex. 70:30 | Impact strength after extraction in water/surfactant [kJ/m$^2$] | | | | | |
|---|---|---|---|---|---|---|
| | 0 h | 235 h | 498 h | 750 h | 1241 h | 2995 h |
| 11 5% of the cmpd. of Ex. B | 636 | 579 | 591 | 600 | 591 | 578 |
| 12 5% of the cmpd. of Ex. C | 661 | 539 | 575 | 563 | 580 | 555 |

What is claimed is:

1. A process for stabilizing and at the same time phase compatibilizing plastics or plastic compositions comprising at least two different polymers, by incorporating polymeric compounds obtained by reacting a sterically hindered amine compound which contains at least one reactive group, with a compatibilizer compound, wherein the compatibilizer compound is a grafted styrene co- or terpolymer selected from the group consisting of styrene/acrylonitrile grafted with maleic anhydride (SAN-g-MAH), styrene/maleic anhydride/methyl methacrylate, styrene/butadiene/styrene block copolymer grafted with maleic anhydride (SBS-g-MAH), styrene/ethylene/propylene/styrene block copolymer grafted with maleic anhydride (SEPS-g-MAH),and styrene/ethylene/butadiene/styrene block copolymer grafted with maleic anhydride (SEPS-g-MAH), and the sterically hindered amines are compounds of formula II, IIa or IIb

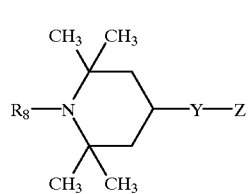
(II)

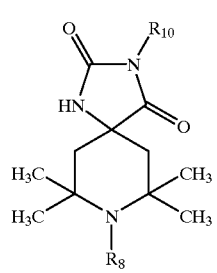
(IIa)

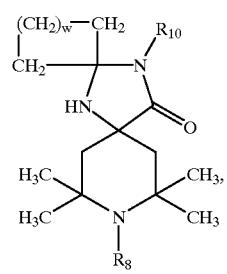
(IIb)

wherein $R_8$ is hydrogen, $C_1$–$C_{25}$alkyl, $C_2$–$C_{20}$alkenyl, $C_2$–$C_{20}$alkynyl, $C_1$–$C_{20}$alkoxy, phenyl-$C_1$–$C_3$alkyl, $C_5$–$C_{12}$cycloalkyl, $C_5$–$C_8$cycloalkoxy, phenyl, naphthyl, hydroxyethyl, —CO—$C_1$–$C_{25}$alkyl, —CO-phenyl, —CO-naphthyl, —CO-phenyl-$C_1$–$C_3$alkyl, —O—CO—$C_1$–l $C_{20}$alkyl, $C_1$–$C_6$—S—$C_1$–$C_6$alkyl, $C_1$–$C_6$—O—$C_1$–$C_6$alkyl, $C_1$–$C_6$—(CO)—$C_1$–$C_6$alkyl,

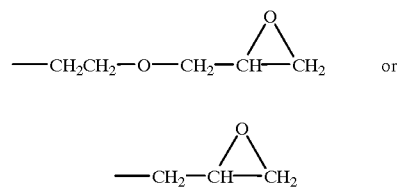

w is a number from 1 to 10;

Y is a single bond, $C_1$–$C_{25}$alkylene, phenylene, biphenylene, naphthylene, —O—$C_1$–$C_{25}$alkylene, —NR$_9$—, —O— or

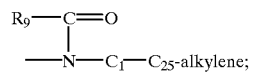

Z is hydrogen, —COOR$_9$, —OR$_9$, hydroxylethyl,

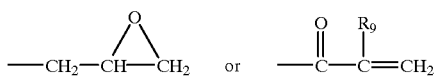

$R_9$ is hydrogen or $C_1$–$C_{12}$alkyl; and $R_{10}$ has the same definition as $R_8$.

2. A process according to claim 1 wherein the polymers to be stabilized are recycled material.

* * * * *